United States Patent [19]

Suzuki et al.

[11] Patent Number: 5,896,471
[45] Date of Patent: Apr. 20, 1999

[54] DEVICE FOR INPUTTING AND OUTPUTTING IMAGE DATA

[75] Inventors: Makoto Suzuki; Takemi Yamamoto, both of Nagoya, Japan

[73] Assignee: Brother Kogyo Kabushiki Kaisha, Nagoya, Japan

[21] Appl. No.: 08/633,487

[22] Filed: Apr. 17, 1996

[30] Foreign Application Priority Data

Apr. 27, 1995 [JP] Japan ................... 7-103386

[51] Int. Cl.[6] ................................................ H04N 1/04
[52] U.S. Cl. ................... 382/313; 358/472; 358/473
[58] Field of Search .......................... 358/471–473, 358/474; 382/313, 314, 315–316; H04N 1/00, 1/04

[56] References Cited

U.S. PATENT DOCUMENTS

| | | |
|---|---|---|
| 4,186,533 | 2/1980 | Schwartz. |
| 4,611,246 | 9/1986 | Nihei ........................... 358/473 |
| 4,860,377 | 8/1989 | Ishigaki ........................ 382/313 |
| 4,959,871 | 9/1990 | Mori et al. ................... 358/473 |
| 5,058,188 | 10/1991 | Yoneda ......................... 382/313 |
| 5,083,218 | 1/1992 | Takasu et al. ................ 358/473 |
| 5,172,243 | 12/1992 | Hayashi et al. .............. 358/473 |
| 5,278,673 | 1/1994 | Scapa et al. ................. 358/473 |
| 5,327,503 | 7/1994 | Kiyohara ..................... 382/313 |
| 5,379,121 | 1/1995 | Yamada et al. .............. 358/473 |
| 5,431,389 | 7/1995 | Wensink et al. ............. 358/473 |
| 5,446,559 | 8/1995 | Birk ............................. 358/472 |
| 5,519,511 | 5/1996 | Tanahashi .................... 358/473 |
| 5,578,813 | 11/1996 | Allen et al. .................. 382/316 |
| 5,581,783 | 12/1996 | Ohashi ......................... 358/473 |
| 5,634,730 | 6/1997 | Bobry .......................... 358/473 |
| 5,644,663 | 7/1997 | Saito et al. .................. 382/313 |

*Primary Examiner*—Kim Yen Vu
*Attorney, Agent, or Firm*—Oliff & Berridge, PLC

[57] ABSTRACT

An input device including a medium support for supporting a medium; a reading unit for reading an image from the medium and for generating image data accordingly; and a movement mechanism for generating relative movement between the medium support and the reading unit.

22 Claims, 7 Drawing Sheets

DEVICE FOR INPUTTING AND OUTPUTTING IMAGE DATA

BACKGROUND OF THE INVENTION

1. Field of the Invention

The present invention relates to an input/output device and particularly to an input/output device capable of inputting and outputting image data.

2. Description of the Related Art

Conventional input devices include keyboards and such simple mechanisms as mouses, trackballs, touch panels, and tablets. However, these input devices have limitations. For example, keyboards are limited to how compact they can be manufactured and can not be used to input diagrams. Mouses do not allow for easy input of characters and can not be used without a flat surface. Trackballs, also, do not allow for easy input of characters and additionally can not be used for finely detailed input. Both touch panels and tablets ordinarily require a large area to be useful and can not easily be employed in a small input device.

Conventional output devices include liquid crystal display panels and electrophotographic or ink-jet style desktop printers. However, these output devices have limitations. Although desktop electrophotographic and ink-jet printers are being made more and more compact, they are still not very portable. Liquid crystal displays are incapable of producing hard copy.

On the other hand, some stand-alone combination input/output devices have been proposed that are compact and portable. For example, there has been known an image reading head and a printing head both housed in a pillar-shaped housing. The printing head can be used to print an image read by the image reading head. In order to read image data with this portable input/output device, the user grasps the housing casing in hand and moves the device over a medium to be read, or read medium. In order to reproduce the image, the user moves the printing head over a write medium. An encoder is provided to the housing of the input/output device. The encoder contacts the read or write medium and rotates according to the amount that the housing is moved. In this way the amount the housing is moved can be detected.

SUMMARY OF THE INVENTION

When the area of the image to be read or printed is larger than the reading head or the printing head, the device must be moved relative to the read or write medium to read or print the image thereof. This is usually the case because the reading head and printing head are small. The user therefore reads or prints an image by holding the housing and moving it in a desired direction. However, accurate reading or printing cannot be accomplished unless the user moves the housing in a straight line. This can prove difficult when reading or printing a large area. Therefore, the reading or printing operation of a large image area must often be repeated many times. It is also difficult to determine corresponding positions of the read and write media. Also, it is difficult for a user to discriminate between portions of the image area that have already been read and portions that have not yet been read. Therefore, too much or too little image data will be read. The same is true when printing.

It is an object of the present invention to provide an input/output device that combines an input unit and an output unit in one housing and that allows a user to easily read image data from a medium or to print image data on a medium without reading or printing an excess or deficiency of data even when images to be read or printed have a larger area than the input and output units.

To achieve these objectives, an input device according to the present invention includes a medium support for supporting a medium; a reading unit for reading an image from the medium and for generating image data accordingly; and movement mechanism for generating relative movement between said medium support and said reading unit.

According to another aspect of the invention, an output device includes a medium support for supporting a medium; an output unit for printing, on the medium supported by said medium support, an image based on image data; and a movement mechanism for generating relative movement between said medium support and said output unit.

BRIEF DESCRIPTION OF THE DRAWINGS

The above and other objects, features, and advantages of the invention will become more apparent from reading the following description of the preferred embodiment taken in conjunction with the accompanying drawings, in which.

DETAILED DESCRIPTION OF THE PREFERRED EMBODIMENTS

An input/output device according to preferred embodiments of the present invention will be described while referring to the accompanying drawings wherein like parts and components are designated by the same reference numerals to avoid duplicating description.

An input/output device 10 of a first embodiment is used in a portable data processing device 12 such as an electronic notebook. The input/output device 10 includes a penshaped input/output pen 16 having an input unit 30 and an output unit 32 integrally combined together; a movement mechanism 20 for moving the input/output pen 16 relative to a medium P. It is desirable that the input/output device 10 be provided with a reading function to read image data from a medium P using the input/output pen 16 and an output function for outputting the retrieved images onto a medium P.

Next, the input/output device 10 of the portable data processing device 12 in the form of an electronic notebook will be described with reference to FIG. 1. The input/output device 10 is provided to a notebook base 9 on one side of the portable data processing device 12. Although not shown in the drawings, a read switch and a write switch are provided to the data processing device 12. The notebook base 9 includes the movement mechanism 20; a stationary medium plate 14 which forms a base for the device 10; and an input/output pen retainer 18 for detachably holding the input/output pen 16, which will be described later. The movement mechanism 20 includes an upper wall 20a and an underside wall 20b. Side walls 14a and 14b for supporting the movement mechanism 20 are positioned one on either side of the stationary medium plate 14. The movement mechanism 20 also includes built-in components (to be described later) for transporting the medium P in the direction indicated by arrow A and built-in components (to be described later) for moving the input/output pen retainer 18 along lines following the directions indicated by arrows B. An infrared transmission/reception unit 22 including a transmission element 22a and a reception element 22b is provided on the stationary medium plate 14.

Figure 2:
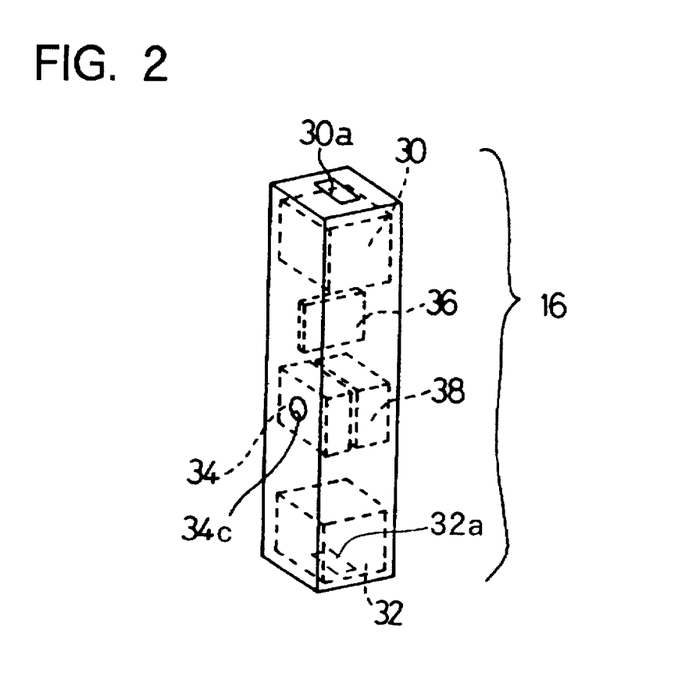
FIG. 2 is a perspective view showing an input/output pen of the portable data processing device with essential components thereof shown in phantom.

Next, the configuration of the input/output pen 16 will be described with reference to FIGS. 2 and 3. The input/output pen 16 is a unit independent and separate from the notebook base 9 and other components of the portable data processing device 12. The input/output pen 16 includes the input unit 30; the output unit 32; a infrared transmission/reception unit 34 including a transmission element 34a and a reception element 34b for transmitting and receiving infrared rays; a control circuit 36 having a CPU 36a; and a battery 38 for supplying electricity. Transmission and reception between the input/output pen 16 and the notebook base 9 is accomplished via the infrared transmission/reception unit 22 and the infrared transmission/reception unit 34, which are provided integrally to the input/output pen 16. This configuration facilitates overall control of the input/output device. Also, restrictions inherent when devices are connected by cables and the like can also be eliminated by using other transmission and reception configurations instead of an infrared transmission and reception configuration. However, using an infrared transmission and reception configuration allows use of simple and inexpensive circuits such as a LEDs or photo diodes.

The input/output pen 16 has a columnar housing, which is substantially a parallelepiped having four lengthwise surfaces and two ends. An image input window 30a for the input unit 30, which serves as a reading unit, is formed on one end of the housing. A printing unit 32a of the output unit 32 is formed in the housing at the other end. An opening 34c for allowing transmission and reception of infrared rays is formed in the input/output pen 16 at a position corresponding to the position of the infrared transmission/reception unit 34, that is, at approximately the center of one of the four lengthwise surfaces.

The input unit 30 is a common unit for reading image data from a medium P placed on top of the stationary medium plate 14 and includes a lighting device, a focal lens, and a charge-coupled device (CCD). In the first embodiment, the CCD contains a row of photosensitive devices aligned in the direction indicated by arrow A. A two-dimensional array may be used instead of elements aligned in a row. Alternatively, a contact type image sensor can be employed.

Further, the input/output pen of the first embodiment is configured for monochrome printing. However, a well-known configuration can be included to provide an input/output pen capable of color printing. For example, color printing would be possible by a configuration having CCD units for each of the three basic colors (red, green, and blue) and a beam splitter between the focal lens and each of the CCD units.

No movement sensor is provided to the input unit 30 of the first embodiment. However, a reading movement detection device for detecting how much the input unit 30 moves may be provided in the input unit 30. For example, a rotatable sensor plate, such as a conventional encoder, can be provided at a position exposed by the opening 34c. When the input unit 30 is moved by the movement mechanism 20 (to be described later), the sensor plate rotates in contact with the medium P so that the amount of movement can be detected. In this case, a memory for storing the retrieved image data should be provided in the input unit 30.

The printing unit 32a of the first embodiment is a monochrome ink jet head provided with a row of nozzles with the same resolution at which the input unit 30 reads images. It is desirable to use an ink jet head with a built in ink reservoir. Further, to prevent the nozzle openings of the ink jet head from clogging, a cap for covering the nozzle openings can be detachably mounted to the output unit. Ink drops are discharged from the row of nozzle openings in the ink jet head in correspondence with movement of the input/output pen retainer 18.

Output can be performed by thermal printing instead of by ink jet printing. In this case, it is desirable for the printing unit 32a to include a thermal head having a row of heating elements; an ink ribbon contacting the row of heating elements; and a motor-driven ribbon feed mechanism for feeding the ink ribbon to the row of heating elements and also for taking up the used portion of the ink ribbon. The feeding speed of the ribbon feeding mechanism corresponds to the movement speed of the input/output pen retainer 18. This type of thermal printing mechanism is well known so its detailed description will be omitted. It should be noted that an ink ribbon is not necessary for a thermal printing mechanism that uses heat-sensitive paper.

Further, when color printing is desired instead of monochrome printing, the input/output pen 16 could be provided with an ink jet head having ejection nozzles for the three different basic printing colors. Alternatively, the input/output pen 16 could be provided with a thermal output head and a color ink ribbon coated with the three basic colors in alternation. In this way, various types of input/output pens 16 could be prepared for filling various uses.

In the first embodiment, the output unit 32 is not provided with a movement detection mechanism for sensing the amount of movement relative to the medium P. However, a rotatable sensor plate, such as a conventional encoder, could be supplied externally near the printing unit 32a. Then, when the input unit is moved by the movement mechanism 20 (to be described later), the sensor plate would rotate in contact with the medium P, and detect the amount of movement relative to the medium P. In this case, print data would be read from the memory for storing the retrieved image data and printed based on data from the movement sensor.

Figure 3:
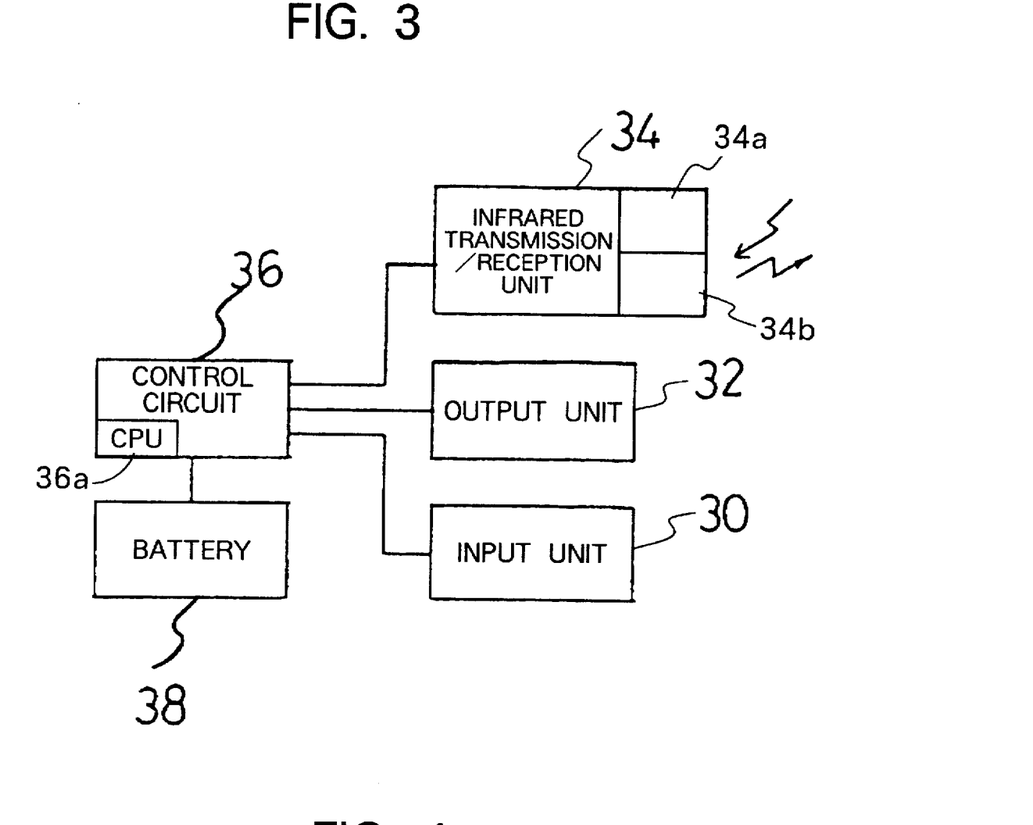
FIG. 3 is a block diagram showing an electrical configuration of the input/output pen.

As shown in FIG. 3, the control circuit 36 is connected to the input unit 30, the output unit 32, and the infrared transmission/reception unit 34, and is operated by the battery 38. The control circuit 36 starts operating when a power switch (not shown in the drawings) provided to the input/output pen 16 is turned on.

The control circuit 36 operates according to command signals, such as read image signals and print image signals, from the input/output device 10. The notebook base 9 transmits a command signal as an infrared beam from the infrared transmission element 22a of the infrared transmission/reception unit 22. The infrared transmission/reception unit 34 receives the infrared beam, whereupon the control circuit 36 determines the number of pulses or the cycle of the infrared beam in order to determined the type of command signal.

If the command signal is a read image signal, then the control circuit 36 activates the input unit 30. As will be described in further detail below, the photosensitive devices generate signals which the transmission element 34a transmits to the input/output device 10 as an infrared beam. Each of the row of photosensitive devices of the input unit 30 outputs an OFF signal when the strength of the received light is greater than a predetermined threshold value or an ON signal when the strength of the received light is less than the predetermined threshold value. According to a preset procedure, the control circuit 36 converts the ON/OFF signal received from each of the image reading elements into infrared pulses, which are outputted by the infrared transmission element 34a. The notebook base 9 receives these infrared pulse signals in a predetermined receiving order and stores them in a reading buffer as image signals for a row of dots.

If the command signal is an print image signal, the control circuit 36 activates the output unit 32 and waits for reception of one row's worth of ON/OFF signals converted from infrared pulses transmitted by the infrared transmission element 22a of the infrared transmission/reception unit 22. Upon receipt of the ON/OFF signals for one row's worth of dots, the control circuit 36 controls the output unit 32 to eject ink from ink nozzles that correspond to ON signals. Thus, dots are only printed for ON signals.

Figure 4:
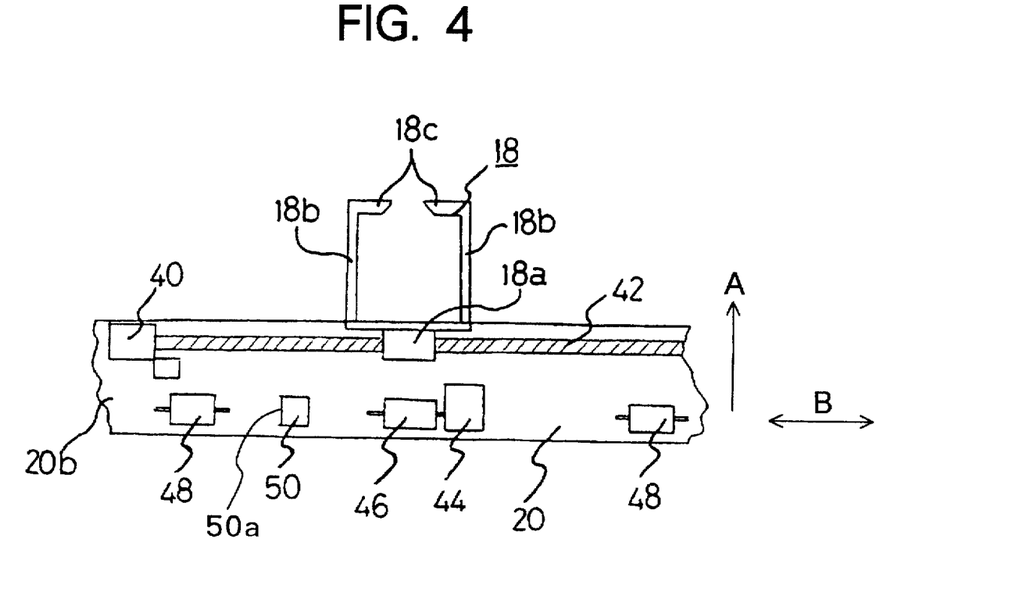
FIG. 4 is a plan view showing general configuration of a movement mechanism of the portable data processing device.

Next, the movement mechanism 20 will be described with reference to FIG. 4. FIG. 4 is a topside view of the movement mechanism with the upper wall 20a removed. It should be noted that a medium P from which images are read or on which images are printed is inserted from the lower side of FIG. 4. As explained earlier, the movement mechanism 20 is supported by side walls 14a and 14b positioned one on either side of the stationary medium plate 14, its external sides forming a rectangular parallelepiped. As shown in FIG. 4, the input/output pen retainer 18 includes a base member 18a supported between the underside wall 20b and the upper wall 20a of the movement mechanism 20 so as to be reciprocally slidable leftward and rightward as viewed FIG. 4.

The input/output pen retainer 18 is formed from a resin. The base member 18a is formed with a screw bearing for fitting onto a screw 42 (to be described later). A pair of protruding sides 18b protrude out from the base member 18a separated by a predetermined distance. One of a confronting pair of anti-disengaging side 18c is formed to a protruding tip of each protruding side 18b. The protruding sides 18b are for elastically holding the input/output pen 16 therebetween. Because the input/output pen retainer 18 detachably holds the input/output pen 16, the posture of the input/output pen 16 can be switched so that either the input unit 30 or the output unit 32 is positioned near the medium P as necessary, thereby simplifying changes from input operations to output operations and preventing the loss of data. This also enables replacing the input/output pen 16 with a variety of other input/output pens according to a user's needs. For example, the monochrome input/output pen 16 of the present embodiment could be replaced with a color input/output pen.

The input/output pen retainer 18 supports the input/output pen 16 orthogonal to the surface of the stationary medium plate 14, which supports the medium P. This insures that the row of photosensitive devices of the input unit 30 is parallel to the surface of the stationary medium plate 14 and to the direction A shown in FIG. 1. The row of ink jet nozzles of the printing unit 32a is also kept parallel to the surface of the stationary medium plate 14 and to the direction A shown in FIG. 1.

It should be noted that as an alternative to the above configuration for detachably mounting an input/output pen 16, the retainer 18 can be provided with a mounting screw by which the input/output pen 16 can be detachably mounted. A well-known clamp mechanism can also be used.

A pulse motor 40 for rotating the screw 42 in either direction is fixed to the underside wall 20b of the movement mechanism 20. Forward and reverse rotation of the pulse motor 40 moves the input/output pen retainer 18 in the directions indicated arrow B of FIG. 1. Upstream from the screw 42, that is, upstream with respect to the direction in which the medium P is fed, a medium feed roller 46 and slave feed rollers 48 are supported on the underside wall 20b of the movement mechanism 20 so as to be rotatable on their axes, which are parallel to the directions B. Openings for the rollers 46 and 48 are formed in the underside wall 20b. The rollers 46 and 48 are disposed in the opening so as to be exposed between the underside wall 20b and the stationary medium plate 14. Although not shown in the drawings, springs are provided for urging the rollers 46 and 48 downward toward the stationary medium plate 14. A medium feed pulse motor 44 for driving the medium feed roller 46 is fixed to the underside wall 20b. Rotation of the medium feed roller 46 transports the medium P across the surface of the stationary medium plate in the direction indicated by arrow A.

A medium detection window 50a is formed near the medium feed roller 46 on the underside wall 20b of the movement mechanism 20. A medium sensor 50 is fixed in the window 50a. The medium sensor 50 is a mechanical switch in contact with the stationary medium plate 14 through the medium detection window 50a and configured to turn on when pushed up by pressure from the medium P. It should be noted that a light reflective switch or other type of switch can be used instead of a mechanical switch.

It should be noted that any configuration which produces relative movement between the medium P and the input/output pen 16 is acceptable instead of the movement mechanism 20. For example, although the movement mechanism 20 described above has a very compact configuration, a scanning mechanism for two-dimensionally scanning the medium P can be provided instead when a slightly larger configuration is acceptable. In this case, the medium P could be fixedly supported by the stationary medium plate 14. The input/output pen retainer 18, which detachably supports the input/output pen 16, could scan substantially parallel to, or preferably exactly parallel to, the medium P in directions which cross, preferably, but not necessarily, in an orthogonal coordinate system as do directions indicated by arrows A and B in the drawings. When a scanning mechanism is used as the movement mechanism, the input/output pen 16 can be accurately positioned with regards to the medium P using a simple configuration.

Also, the mechanism for moving the input/output pen 16 could be a separate unit from the stationary medium plate 14. Also, although in the first embodiment the movement mechanism 20 is supported over the stationary medium plate 14, the opposite is also possible. It is preferable that the structure for supporting the medium P supports the structure for supporting the input/output pen 16, because with this configuration the input/output pen 16 is more stable and can be more easily positioned with regards to the medium P. However, when structure for supporting the input/output pen 16 supports the structure for supporting the medium P, the input/output pen 16 can be accurately positioned using a comparatively simple configuration.

Figure 5:
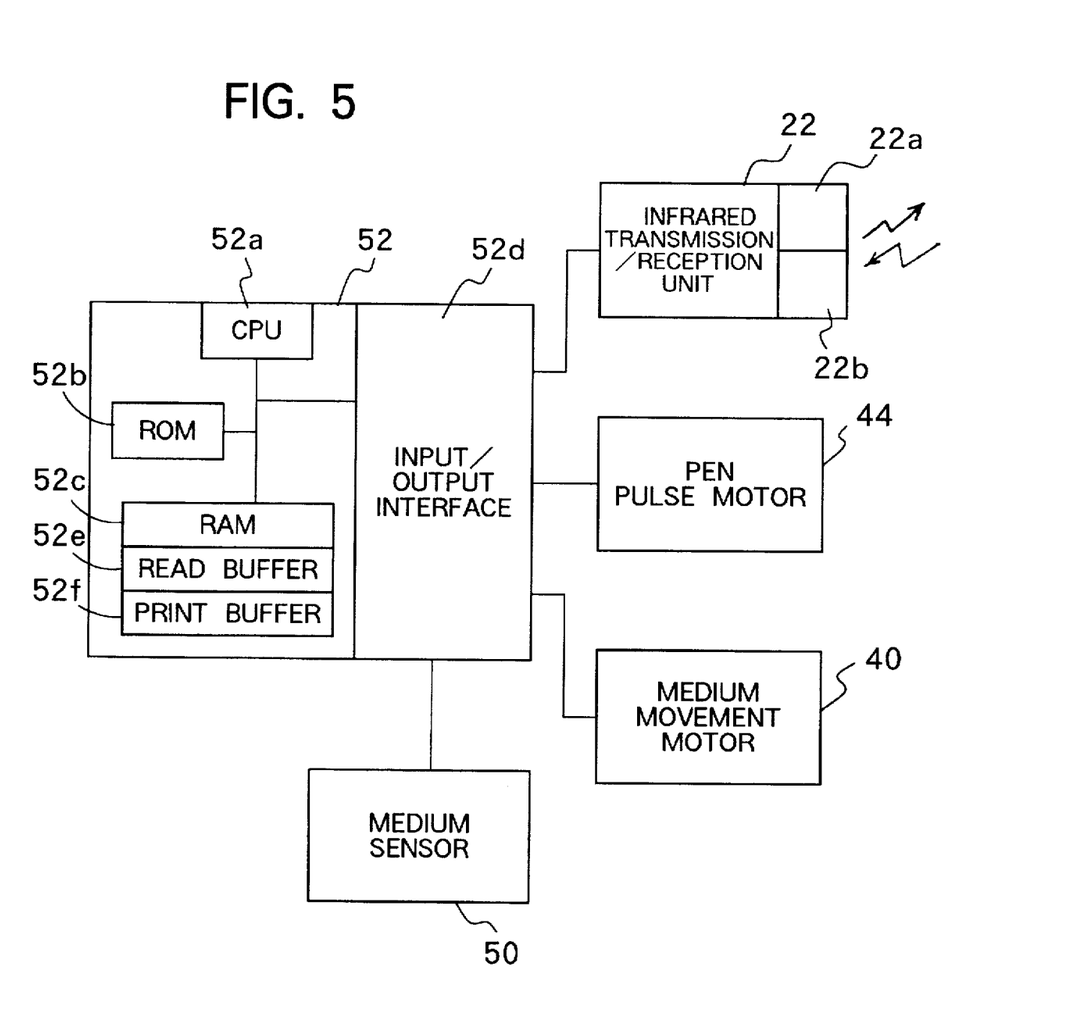
FIG. 5 is a block diagram showing an electrical configuration of the portable data processing device.

The electrical configuration of the input/output device 10 will be described next. As shown in FIG. 5, a processing control circuit 52 of the portable data processing device 12 includes a well-known CPU 52a, a ROM 52b, and a RAM 52c, which are connected to an input/output interface 52d by bus lines. The RAM 52c further includes a read buffer 52e and a print buffer 52f. The pulse motor 40 and the medium feed pulse motor 44 of the movement mechanism 20 are connected to the processing control circuit 52 via a driving circuit (not shown). The medium sensor 50 and the infrared transmission/reception unit 22 is also connected to the processing control circuit 52.

Next, the operations of the processing control circuit 52 will be explained. Preparations for input operations, that is, operations for reading an image from an image-bearing medium P, such as a printed sheet, will be explained. First, the user mounts the input unit 30 of the input/output pen 16 in the input/output retainer 18 so that it is facing towards the stationary medium plate 14. In this position, the infrared transmission/reception unit 34 of the input/output pen 16 are pointed toward the infrared transmission/reception unit 22 of the portable data processing device 12. Also, the row of photosensitive devices of the input unit 30 is juxtaposed parallel to the direction A shown in FIG. 1. Next, the user switches the input/output pen 16 on and inserts, from the medium insertion side (shown in the foreground of FIG. 1), image-bearing medium P between the stationary medium plate 14 and the medium feed roller 46 and slave feed rollers 48 of the movement mechanism 20. At this time, the medium P should be set so that the side bearing an image is face up. The user then switches on the read switch of the portable data processing device 12,the thereby activating the CPU 52a, which operates according to an input routine represented by the flow chart in FIG. 6.

Figure 6:
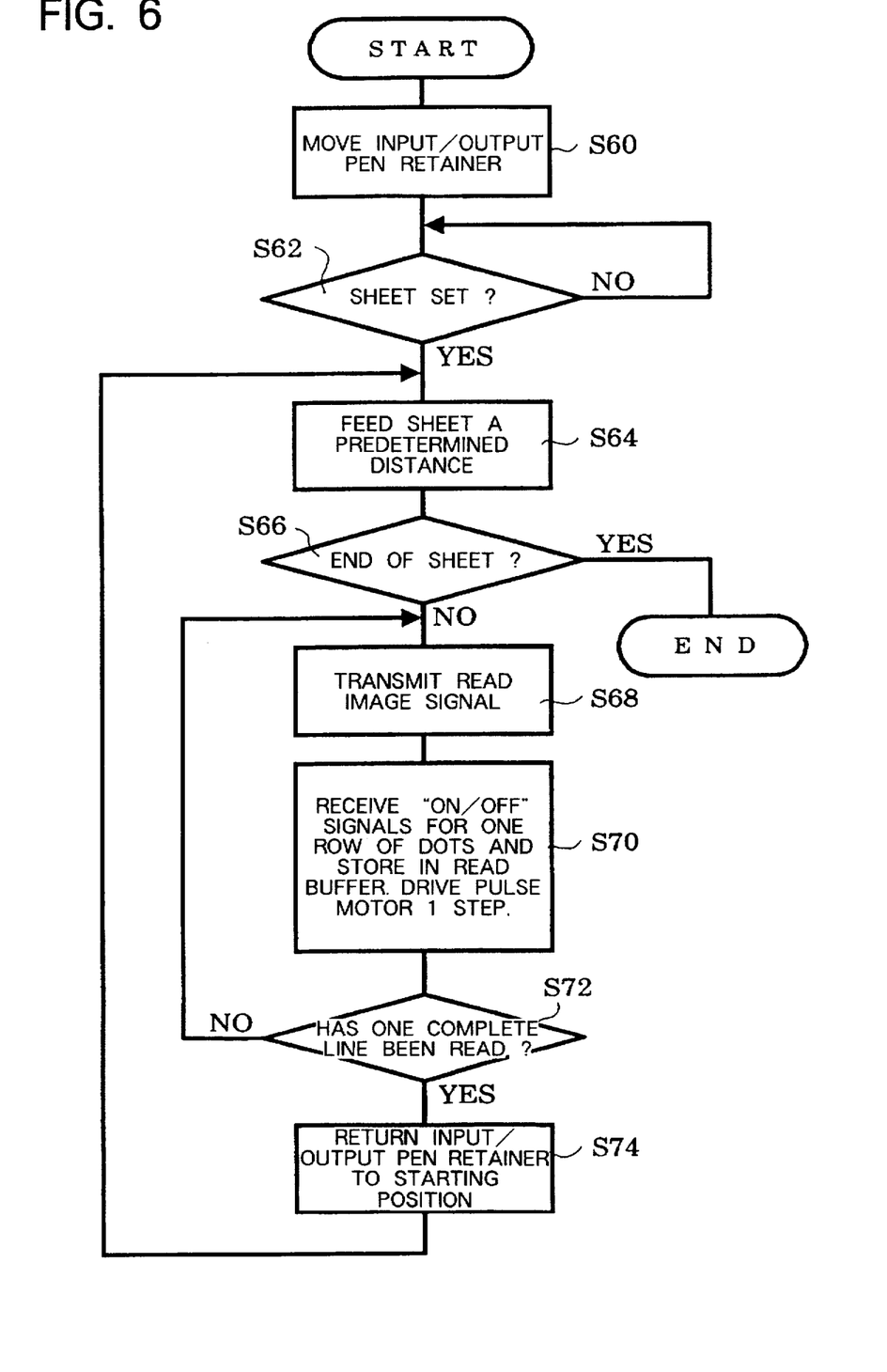
FIG. 6 is a flow chart showing steps of an input routine of the portable data processing device.

Next, the input routine will be described with reference to the flow chart in FIG. 6. Hereinafter, process steps will be referred to in the drawings and the following text as Si, wherein i is the number of an individual step. When the read switch is switched on, the CPU 52a drives the pulse motor 40 to rotate the screw 42, which moves the input/output pen 16 and input/output pen retainer 18 to a starting point at the left edge of a first line of dot rows in the direction indicated by arrow B (S60). Next, the medium sensor 50 checks for the medium P (S62). If the medium P is detected by the medium sensor 50 (S62=yes), then the medium feed pulse motor 44 is driven a specified amount to rotate the medium feed roller 46 a predetermined amount. Rotation of the medium feed roller 46 transports the medium P a predetermined distance in the direction A shown in FIG. 1 (S64). Then the medium sensor 50 again checks whether the medium P is detected (S66). The routine is ended if the medium P is not detected.

If the medium P is detected (S66=no), then the CPU 52a generates a read image signal, which is converted into infrared pulses and transmitted by the infrared transmission element 22a of the infrared transmission/reception unit 22 (S68). When the infrared reception element 34b of the input/output pen 16 receives the infrared pulses representing the read image signal, the control circuit 36 of the input/output pen 16 activates the input unit 30. As a result, the photosensitive devices produce ON/OFF signals which the control circuit 36 converts to infrared pulses in a preset dot pattern according to movement of the movement mechanism 20 as it scans the input unit 30 across the medium P. The infrared pulses are then transmitted by the infrared reception element 22b. The control circuit 36 waits for reception of another read image signal after the ON/OFF signals for all the dots in one row has been outputted.

After the CPU 52a receives the ON/OFF signals for one row of dots from the input/output pen 16, the data for those signals is stored in a read buffer 52e in the RAM 52c of the processing control unit 52. Then, the pulse motor 40 is driven one step (S70), by which the input/output pen retainer 18 is moved exactly one dot row's distance to the right as viewed in FIG. 1.

Figure 1:
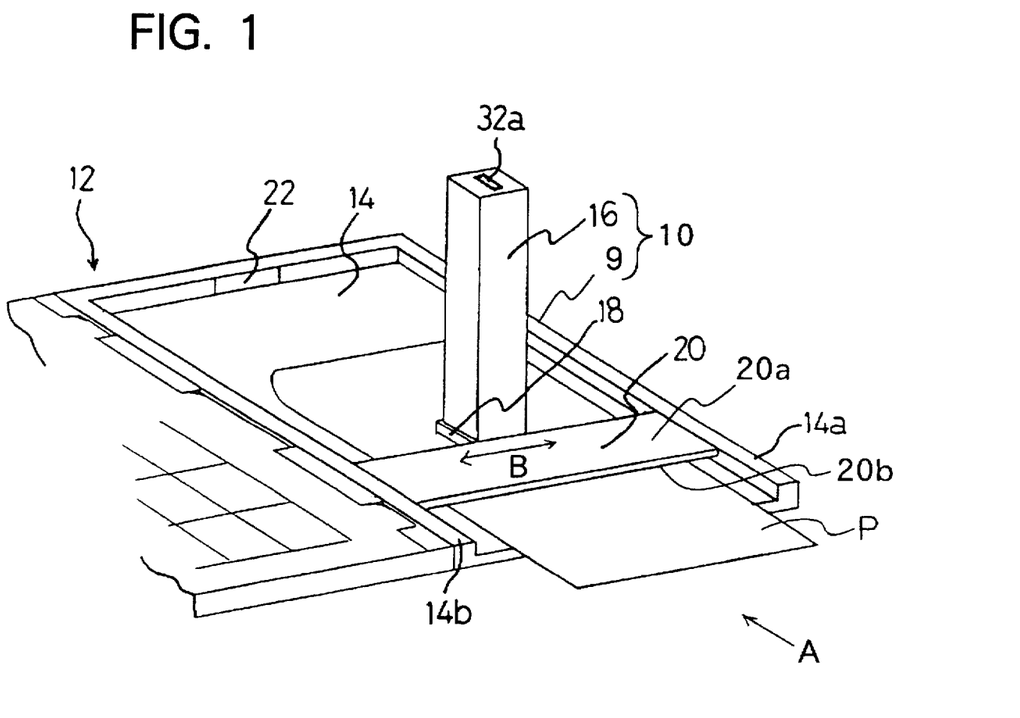
FIG. 1 is a perspective view schematically showing a portable data processing device according to a first embodiment of the present invention.

At this point, whether or not all dot rows of the first line have been read is determined by checking if the pulse motor 40 has moved the input/output pen retainer 18 from the starting point to an end position at the right edge, as viewed in FIG. 1, of the medium P (S72). Also, when a reading range is indicated in advance, determining whether a complete line's worth of dot rows has been read can be accomplished by checking the amount the pulse motor 40 has been driven from the starting point. Alternatively, a sensor for detecting the read ending position could be provided.

If the current line of dot rows has not been completely read (S72=no), then the routine returns to step S68, and another dot row's worth of image data is read. At this point, the ON/OFF data for the row of dots read in step S70 is developed in the read buffer 52e in the RAM 52c of the processing control unit 52, creating one row of bit map data.

If one complete line's worth of dot rows has been read (S72=yes), then the pulse motor 40 is driven in the reverse direction to return the input/output pen retainer 18 to the starting position (S74). Then the routine returns to step S64. As mentioned before, the medium P is transported in S64 a predetermined distance in the direction A (referred to as medium transport direction hereinafter). It is desirable that the predetermined distance equal the reading range of the input unit 30, that is, the length of the row of photosensitive devices. This would insure that a subsequent line can be read after the present line. In this way, processes for reading image data using the input unit 30 are repeated until the medium P is no longer detected in step S66. At this point, the image data for the full page of medium P will have been stored in the read buffer 52e in the RAM 52c of the processing control unit 52.

After completing the input routine, it is then possible to output the page of image data via the output unit 32. It is also possible to perform such processing as character recognition on the image data that has been read. For example, it would be possible to read characters hand written by the operator and process them with character recognition software. Print data for the recognized characters could then be generated by a character generator and then printed.

Figure 7:
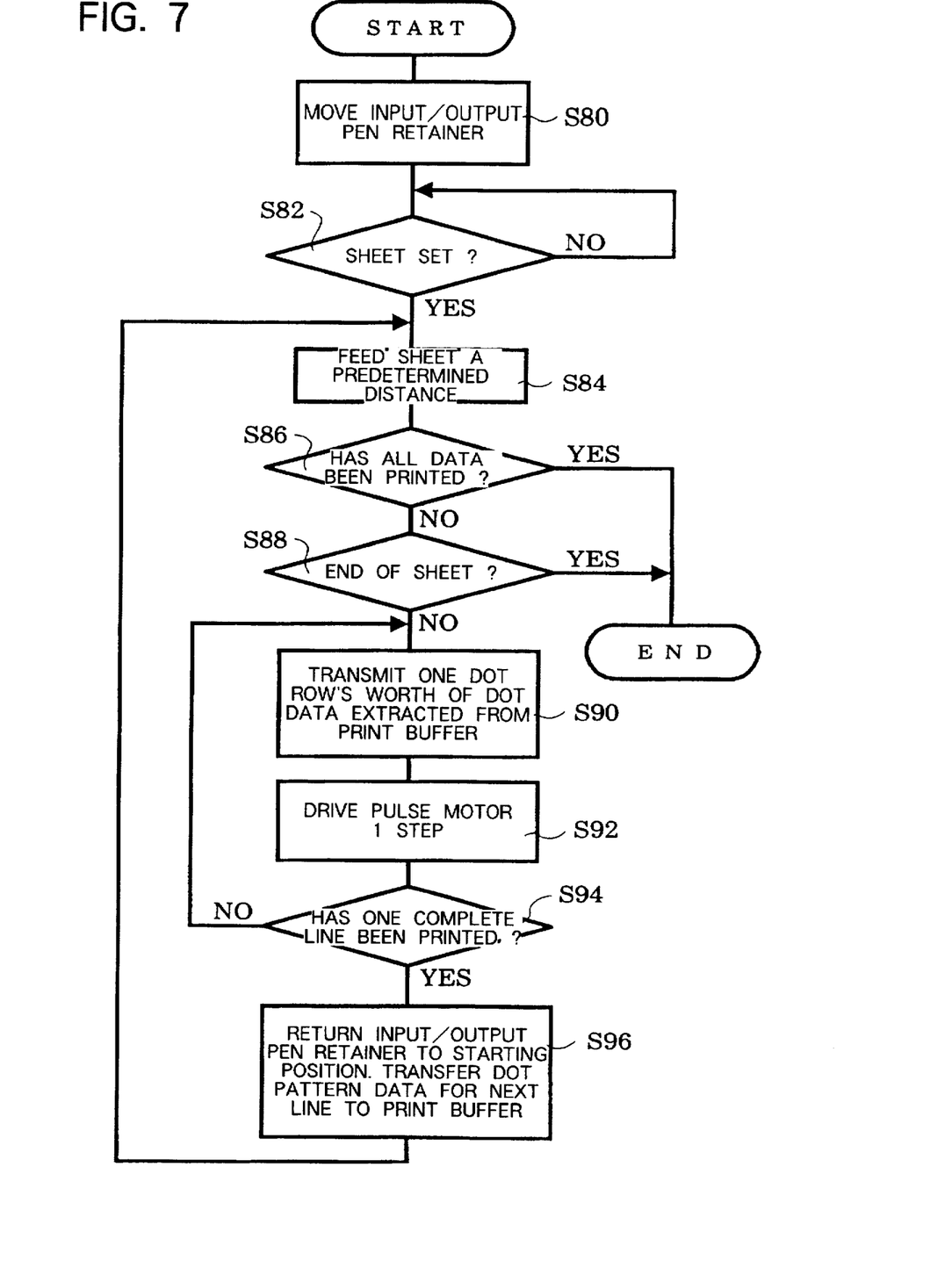
FIG. 7 is a flow chart showing steps of an output routine of the portable data processing device.

Next, an output routine will be described with reference to the flow chart in FIG. 7. First, the user sets the output unit 32 of the input/output pen 16 in the input/output retainer 18 so that it is facing towards the stationary medium plate 14. In this position, the infrared transmission/reception unit 34 of the input/output pen 16 is pointed toward the infrared transmission/reception unit 22 of the portable data processing device 12. Also, the row of ink jet nozzles in the printing unit 32a are arranged parallel to the direction A shown in FIG. 1. The input/output pen 16 is then switched on. Next, a medium P, such as a clean sheet of paper, is inserted from the medium insertion side (shown in the foreground of FIG. 1) between the stationary medium plate 14 and the medium feed roller 46 and slave feed rollers 48 of the movement mechanism 20. Then, the print switch of the portable data processing device 12 is switched on, and the CPU 52a operates according to the output routine represented by the flow chart in FIG. 7.

When the print switch is switched on, the image data in the read buffer 52e is transferred to the print buffer 52f. At the same time, the pulse motor 40 is driven to rotate the screw 42, thereby moving the input/output pen 16 and input/output pen retainer 18 to the starting point at the left edge of the first line (S80). The print buffer 52f stores a single line's worth of dot pattern data required for the output unit 32 to print a single line of dot rows. Therefore, at the beginning of the output routine, dot pattern data corresponding to the first line to be printed is transferred from the read buffer 52e into the print buffer 52f.

Next, the medium sensor 50 checks for the medium P (S82). If the medium P is detected by the medium sensor 50 (S82=yes) then the medium feed pulse motor 44 is driven a specified amount to rotate the medium feed roller 46 a predetermined amount, which in turn transports the medium P in the direction A shown in FIG. 1 (S84). If it is determined that not all data in the print buffer 52f has been printed (S86=no) the medium sensor 50 again checks for the medium P (S88). The determination of S86 is performed by checking whether dot pattern data remains in the read buffer 52e. If no data remains (S86=yes) or a medium P is not detected (S88=yes), then the process is ended.

Because in this example the output routine has just started, an print image signal generated by the CPU 52a is converted into infrared pulses and transmitted by the infrared transmission element 22a to the infrared reception element 34b. Simultaneously with this, dot pattern data for the first row of dots at the starting point is extracted from the first line's worth of dot pattern data stored in the print buffer 52f. The ON/OFF data for each dot is converted into infrared pulses in a predetermined sequence and transmitted (S90). The infrared pulses representing the print image signal are received by the reception element 34b of the input/output pen 16, converted into a print image signal and sent to the control circuit 36, which activates the output unit 32 as a result. The control circuit 36 then awaits reception of data for another row of dots from the processing control circuit 52. After receiving ON/OFF signals for a row of dots, the control circuit 36 activates the output unit 32 to eject ink from ink jet nozzles corresponding to ON signals, thereby printing one row of dots. After printing this row of dots, the control circuit 36 of the input/output pen 16 awaits for reception of the next print image signal. It should be noted that after the processing control circuit 52 transmits dot pattern data for a row of dots to be printed, the transmitted dot pattern data is erased from the print buffer 52f and the remaining dot pattern data for the line is shifted to the front of the print buffer 52f. Then, the pulse motor 40 is driven one step (S92), thereby moving the input/output pen retainer 18 a distance equivalent to one row of dots to the right as viewed in FIG. 1.

At this point, it is determined if one complete line (i.e., in the directions indicated by arrow B shown in FIG. 1) has been printed by checking if the pulse motor has moved the input/output pen retainer 18 from the starting point to the end position (S94). If the current line has not been completely printed (S94=no), then the routine returns to step S90, and another row of image data is printed. The determination in step S94 is accomplished by checking for remaining dot pattern data in the print buffer 52f. Remaining data in the print buffer 52f indicates that one line has not been completely printed.

If printing of the current line has been completed (S94=yes), then the pulse motor 40 is driven in the reverse direction, returning the input/output pen retainer 18 to the starting position, and the dot pattern data corresponding to the next line is extracted from the image data in the read buffer 52e and transferred to the print buffer 52f (S96). Then the routine returns to step S84. As mentioned before, at S84 the medium P is transported in the direction A a predetermined distance, which equals a printing range, that is, a width of the printing unit 32a, in the medium transport direction. In other words, the medium P should be transported a distance that allows the line following the one just printed to be printed next.

Thus, the process of reading image data by the input unit is repeated until it is determined that no dot pattern data remains in the print buffer 52f in step S86 or until the medium P can no longer be detected in step S88. In this way, the image is outputted to the medium P. Therefore, image data read from the medium P during the input routine is printed onto a separate medium P during the output routine.

The present invention is not limited to the type of image reproduction described in the first embodiment. Image data from an external device could be transmitted to and stored in the read buffer 52e and then printed onto a desired medium P in the manner described above. In this case, the processing control circuit 52 and the external device could be connected by an interactive interface, such as an ordinary cable connection or a radio transmission/reception unit. Radio transmission and reception could be accomplished by providing a radio transmission circuit and a radio reception circuit, wherein the radio transmission circuit has a circuit to convert serial data to pulses. Alternatively, radio transmission and reception could be performed as in the first embodiment by an infrared transmission element and an infrared reception element for transmitting and receiving infrared pulse signals. Also, image data inputted via the input unit 30 could be transmitted to the external device in the same fashion. Providing a radio transmission and reception circuit or other means for transmitting and receiving data between the input/output device and an external device enables image data read by the input/output pen 16 to be processed in the computer 90.

The infrared transmission/reception units 22 and 34 of the first embodiment include a fairly expensive configuration. Instead, a radio transmission circuit and a radio reception circuit capable of radio transmission and reception may be provided in both the stationary medium plate 14 and the input/output pen 16. A cable connection between the stationary medium plate 14 and the input/output pen 16 would also be acceptable although this would be a more troublesome configuration for the user.

Figure 8:
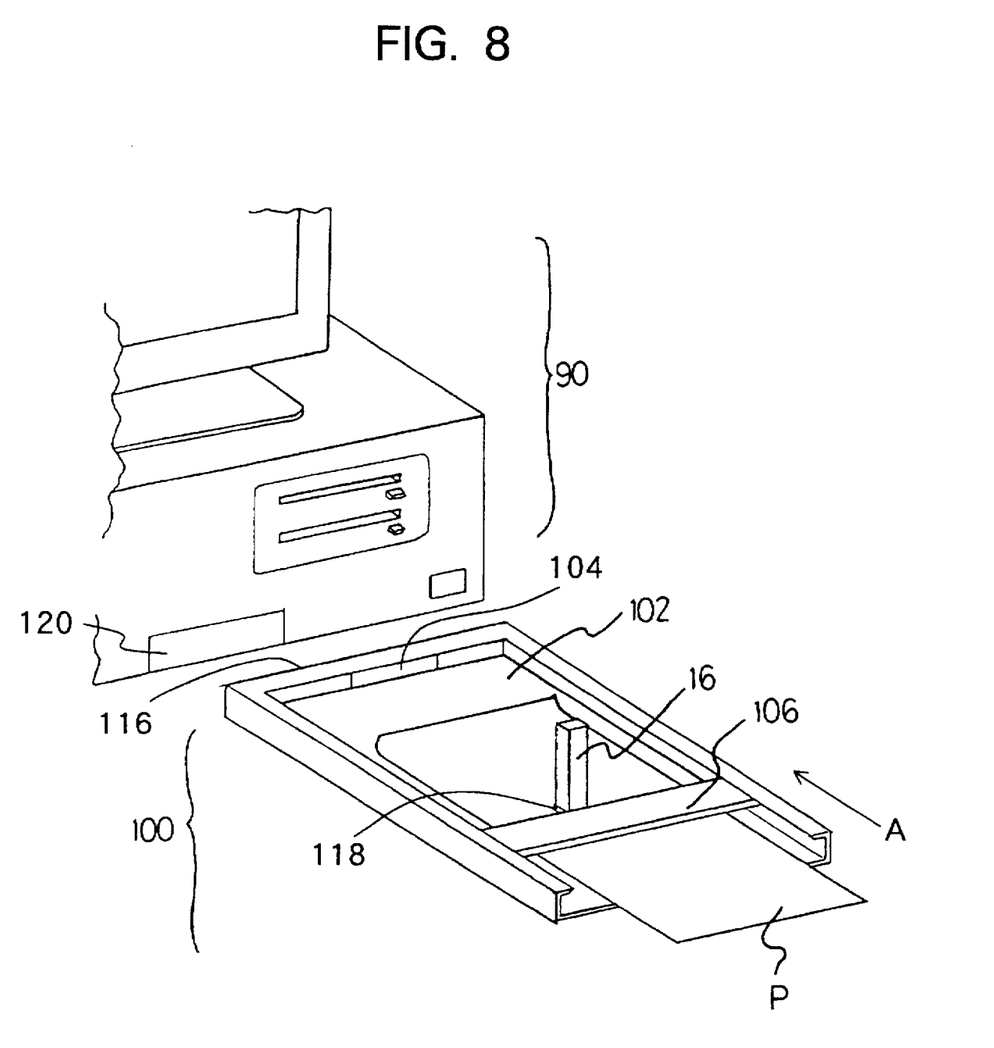
FIG. 8 is a perspective view showing a portable data processing device and a computer according to a second embodiment of the present invention.

Next, a second embodiment of the present invention will be described with reference to the schematic drawing of FIG. 8 and the block diagram of FIG. 9. The second embodiment describes the present invention applied to an input/output device 100 of a computer 90, which serves as an external device. The input/output device 100 includes an input/output pen 16 and a stationary medium plate 102. The input/output pen 16 is of the same construction as that in the first embodiment shown in FIG. 1. Therefore, its description will not be repeated. The stationary medium plate 102 is provided with a infrared transmission/reception unit 104 including a transmission element 104a and a reception element 104b for transmission and reception of data between the infrared transmission/reception unit 22 of the input/output pen 16; a transmitter and receiver circuit 116 for transmitting and receiving data between the computer 90; and a movement mechanism 106 having similar configuration to that of the movement mechanism 20 in the first embodiment.

The movement mechanism 106 includes a medium movement motor 110 for transporting a medium P. The movement mechanism 106 is movable in a direction parallel to a medium supporting surface of the stationary medium plate 102 and orthogonal to the medium transport direction A. The movement mechanism 106 is also provided with a pen retainer 118 for detachably holding the input/output pen 16; as shown in FIG. 9, a motor 108 for moving the pen retainer 118; and a medium sensor 112. For detailed description of these components of the movement mechanism 106, refer to description of corresponding components of the movement mechanism 20.

Figure 9:
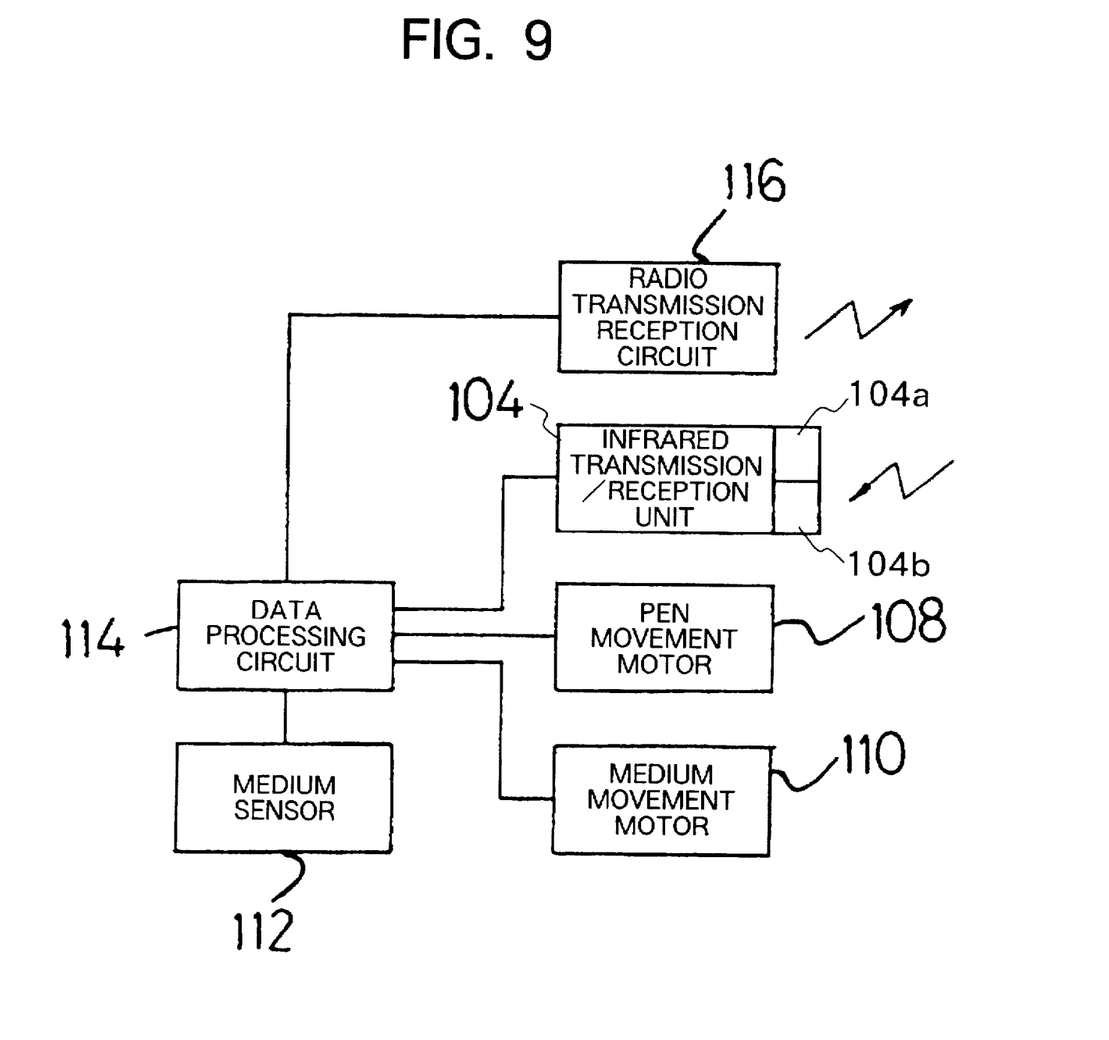
FIG. 9 is a block diagram showing an electrical configuration of the portable data processing device according to the second embodiment.

As shown in the block diagram of FIG. 9, a data processing circuit 114 of the input/output device 100 is connected to the pen driving motor 108, the medium driving motor 110, the infrared transmission/reception unit 104, the medium sensor 112 and the transmitter and receiver circuit 116.

The computer 90 is provided with a transmitter and receiver circuit 120 to correspond to the transmitter and receiver circuit 116. With this configuration, the above-described transmission and reception of data between an input/output device and an external device is possible. Also, image data read from a medium P can be processed in the computer 90. The processed image data can then be transmitted to the data processing circuit 114 of the input/output device 100 and printed on a separate medium.

While the invention has been described in detail with reference to specific embodiments thereof, it would be apparent to those skilled in the art that various changes and modifications may be made therein without departing from the spirit of the invention, the scope of which is defined by the attached claims.

For example, although the embodiments described above relate to reading and printing monochrome images, the present invention can easily be applied to reading and printing of color images as well. As described above, the input/output pen for monochrome use may simply be exchanged with one for color use. The same stationary medium plates and movement mechanisms can be used for color printing as for monochrome printing. Also, it should be evident that both normal paper and heat-sensitive paper may be used as the printing medium P simply by exchanging the input/output pen for one suited to the desired medium. Input/output pens with different reading precision may also be used interchangeably.

In the preferred embodiment, the input/output device is described for an electronic notebook. In an alternative embodiment, the input/output device is used in conjunction with a remotely located computer.

As is clear from the above-described embodiments, an input/output device according to the present invention is capable of accurately moving a medium and an input/output unit relative to each other. In this way, an image larger than a reading portion of the input/output unit can be read from a medium without reading more or less data than necessary by overrunning or underrunning the image.

What is claimed is:

1. An input device comprising:

a medium support for supporting a medium;

a reading unit for reading an image from the medium and for generating image data accordingly; and a movement mechanism for generating relative movement between said medium support and said reading unit, said movement mechanism including:

a reading unit support for supporting said reading unit, said medium support supporting the reading unit support;

medium transport means for transporting the medium in a first direction; and support movement means for moving the reading unit support in a second direction opposite to the first direction.

2. An input device as claimed in claim 1, further comprising:

transmission/reception means for performing, between said medium support and said reading unit, transmission and reception of the image data; and processing means for processing the image data and provided in said medium support.

3. An input device as claimed in claim 2, wherein said processing means includes external transmission/reception means for performing transmission and reception of the image data with an external device.

4. An input device as claimed in claim 2, wherein said transmission/reception means includes a radio transmission circuit and a radio reception circuit allowing radio transmission and reception of the image data between said medium support and said reading unit.

5. An input device as claimed in claim 2, wherein said transmission/reception means includes an infrared transmission element and an infrared reception element for enabling infrared transmission and reception of the image data between said medium support and said reading unit.

6. An input device as claimed in claim 1, wherein said movement mechanism includes a reading unit support for supporting said reading unit, the reading unit support supporting said medium support.

7. An input device as claimed in claim 1, further comprising an output unit formed integrally with said reading unit and for printing an image based on image date generated by said reading unit.

8. An input device as claimed in claim 1, wherein said reading unit support includes mounting means for detachably holding said reading unit.

9. An input device as claimed in claim 1, wherein said movement mechanism includes a scanning mechanism for scanningly moving said reading unit two-dimensionally relative to the medium while supporting said reading unit parallel to the medium.

10. An input device of claim 1, wherein the medium support and the movement mechanism form a slot for receiving the medium.

11. An output device comprising:

medium support for supporting a medium;

an output unit for printing, on the medium supported by said medium support, an image based on image data; and a movement mechanism for generating relative movement between said medium support and said output unit, said movement mechanism including:

an output unit support for supporting said output unit, said medium support supporting the output unit support;

medium transport means for transporting the medium in a first direction; and support movement means for moving the output unit support in a second direction opposite to the first direction.

12. An output device as claimed in claim 11, wherein said movement mechanism includes an output unit support for supporting said output unit, the output unit support supporting said medium support.

13. An output device as claimed in claim 11 further comprising:

transmission/reception means for performing, between said medium support and said output unit, transmission and reception of the image data; and processing means for processing the image data and provided in said medium support.

14. An output device as claimed in claim 13, wherein said processing means includes external transmission/reception means for performing transmission and reception of the image data with an external device.

15. An output device as claimed in claim 13, wherein said transmission/reception means includes a radio transmission circuit and a radio reception circuit allowing radio transmission and reception of the image data between said medium support and said output unit.

16. An output device as claimed in claim 13, wherein said transmission/reception means includes an infrared transmission element and an infrared reception element for enabling infrared transmission and reception of the image data between said medium support and said output unit.

17. An output device as claimed in claim 11, wherein said output unit support includes mounting means for detachably holding said output unit.

18. An output device as claimed in claim 11, wherein said movement mechanism includes a scanning mechanism for scanningly moving said output unit two-dimensionally relative to the medium while supporting said output unit parallel to the medium.

19. An output device as claimed in claim 11 further comprising a reading unit formed integrally with said output unit and for generating the image data by reading an image from the medium.

20. The output device of claim 11, wherein the medium support and the movement mechanism form a slot for receiving the medium.

21. An input/output unit comprising:

a housing having a reading end and an output end at opposite ends thereof;

a reading unit provided at the reading end of the housing and capable of reading an image from an original and generating image data accordingly;

an output unit provided at the output end of the housing and capable of printing an image on a medium based on image data generated by the reading unit;

a movement mechanism for generating relative movement selectively between either the reading unit and the original or the output unit and the medium, said movement mechanism including:

a housing unit support for supporting said housing, a medium support supporting the housing unit support;

medium transport means for transporting the original or the medium in a first direction; and support movement means for moving the output unit support in a second direction opposite to the first direction.

22. The output device of claim 21, wherein the medium support and the movement mechanism form a slot for receiving the original or the medium.

* * * * *